J. B. SCHUMAN.
STALK HARVESTER.
APPLICATION FILED MAY 22, 1906.

951,223.

Patented Mar. 8, 1910.
8 SHEETS—SHEET 1.

Witnesses
Vernon Plummer
Thomas W. McMeans

Inventor
James B. Schuman
Bradford S Hood
Attorneys

J. B. SCHUMAN.
STALK HARVESTER.
APPLICATION FILED MAY 22, 1906.

951,223.

Patented Mar. 8, 1910.
8 SHEETS—SHEET 7.

Fig. 8.

Witnesses
Vernon Plummer
Thomas W. McMeans

Inventor
James B Schuman
By Bradford Hood.
Attorneys

UNITED STATES PATENT OFFICE.

JAMES B. SCHUMAN, OF INDIANAPOLIS, INDIANA, ASSIGNOR TO THE SCHUMAN COMPANY, OF INDIANAPOLIS, INDIANA, A CORPORATION OF MAINE.

STALK-HARVESTER.

951,223. Specification of Letters Patent. Patented Mar. 8, 1910.

Application filed May 22, 1906. Serial No. 318,167.

*To all whom it may concern:*

Be it known that I, JAMES B. SCHUMAN, a citizen of the United States, residing at Indianapolis, in the county of Marion and State of Indiana, have invented certain new and useful Improvements in Stalk - Harvesters, of which the following is a specification.

The object of my invention is to produce a machine capable of harvesting and shocking a stalk crop, such as corn.

The accompanying drawings illustrate my invention.

In the drawings, 10 indicates a harvester frame supported by wheels 11 and 12, said frame being similar in many respects to the frame of an ordinary self-binding harvester. Arranged at the forward end of frame 10 are projecting fingers 13 which carry gathering chains 14 of an ordinary construction which serve to direct two rows of stalks to the cutting mechanism 15 which may be of any approved type. I prefer to cut two rows simultaneously as it enables me to make a more compact arrangement of the shocks in the field, thus saving room for planting a following crop, such as wheat.

Arranged immediately to the rear of the cutters 15 is a receiving platform 16 upon which the cut stalks will fall, being assisted in their movement thereto by a reel 17 driven by a suitable train of gearing 18. The table 16 is traversed transversely of the line of movement of the machine by chains 20 provided with drag teeth 21 which serve to carry the stalks transversely across the platform 16 and deliver the same to an upwardly inclined carrier 22, the teeth 21 passing between guards 23 which serve to strip the stalks from the teeth as they are delivered to the carrier 22. The stalks are held upon the carrier 22 by spring fingers 24 in a well known manner. In order to further straighten the stalks I provide at the upper end of the support for carriers 22, shorter endless carriers 221 having regularly spaced teeth 222. Chains 20 and carrier 22 are driven by a chain 25 driven from a shaft 26 connected to the bull-wheel 11 in an ordinary manner.

Arranged at the upper end of carrier 22 is an intermittently rotating shaft 30 provided at various points in its length with pairs of oppositely extending arms 31 and the space between these arms is bridged by plates 32 which form a pocket into which the stalks are delivered from the carrier 22.

Any suitable means may be used for intermittently turning shaft 30 through a half revolution so as to bring one or the other of the sets of an arm 31 up beneath the stalks accumulated in the pocket 32 and discharge the bunch of stalks to the shock-forming mechanism. In the drawings, I have shown this means as consisting of the following parts: Mounted loosely upon one end of shaft 30 is a pulley 33 over which runs a chain 34 driven by the upper shaft 35 of the carrier 22. Chain 34 is provided with one or more transversely projecting fingers 37 adapted to come intermittently into engagement with one or the other of a pair of oppositely extending arms 36 attached to shaft 30. When the cut stalks fall upon the platform 16 they may not lie perfectly square and consequently they may be delivered to the carrier 22 in a somewhat confused condition and, if delivered directly, and in a continuous stream to the shock-forming cradle they might not lie as evenly as is desirable. It is for this reason that the bunching mechanism, just described, is introduced. The fingers 22' of the carrier 22, and the fingers 222 of the carriers 221, at the upper end of their travel pass adjacent guards 29 which strip the stalks from the fingers and discharge the stalks to the arms 31. The fingers 37 are so timed relative to the fingers 22' that, should one end of a stalk arrive at the upper end of carrier 22 before its other end the following fingers 22' would straighten it up and discharge it squarely into the bunch-forming pocket made by the arms 31. By this means the stalks are deposited squarely and evenly in the shock-forming cradle now to be described.

Figure 1:
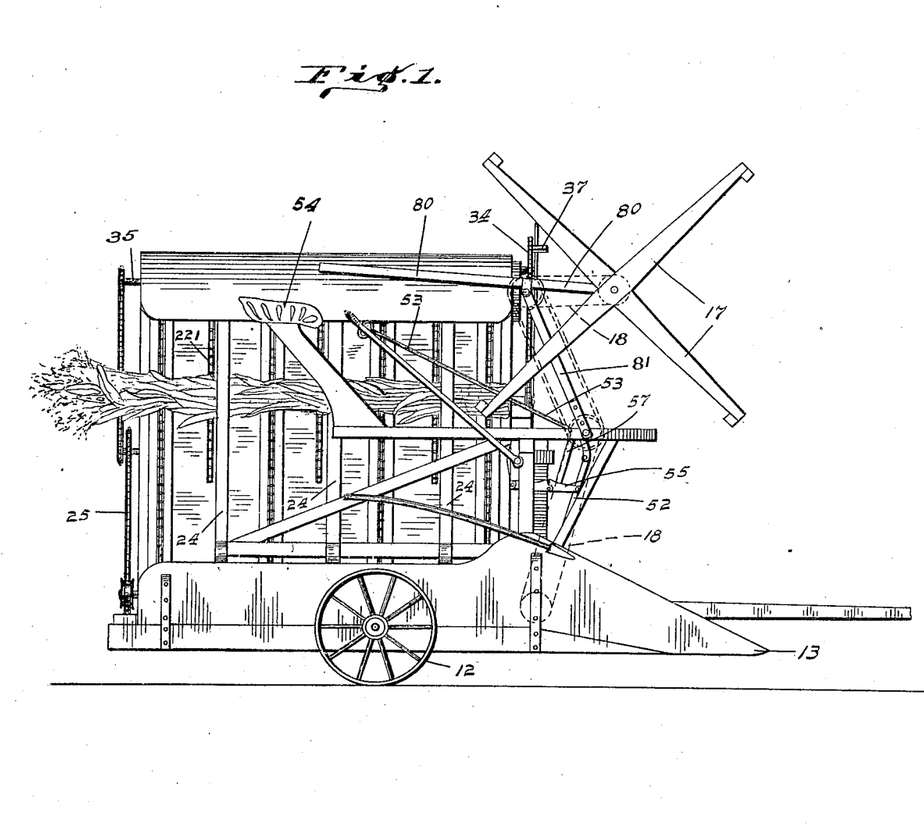
Figure 1 is a side elevation from the cutter side, of a machine embodying my invention.
Figure 2:
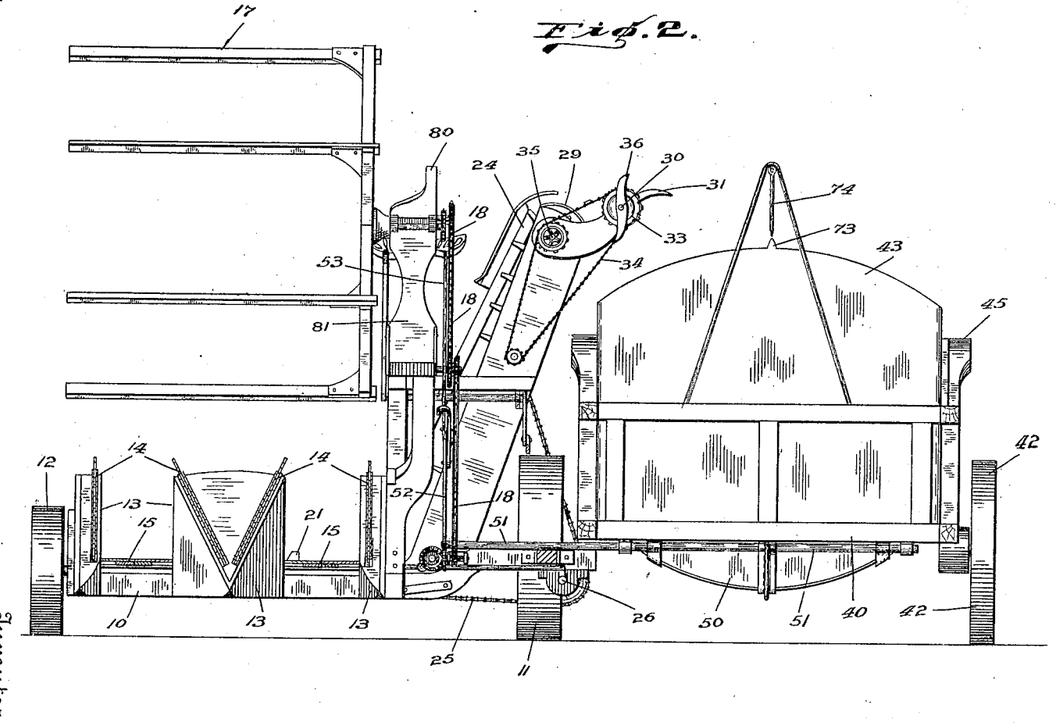
Fig. 2 is a front elevation.
Figure 3:
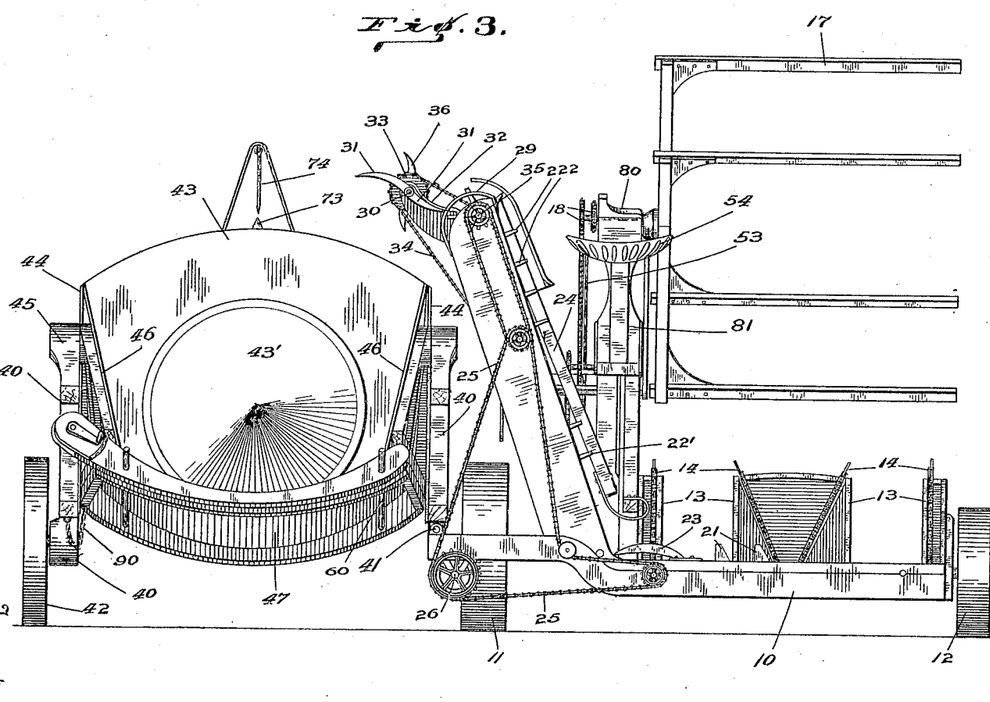
Fig. 3 a rear elevation.
Figure 4:
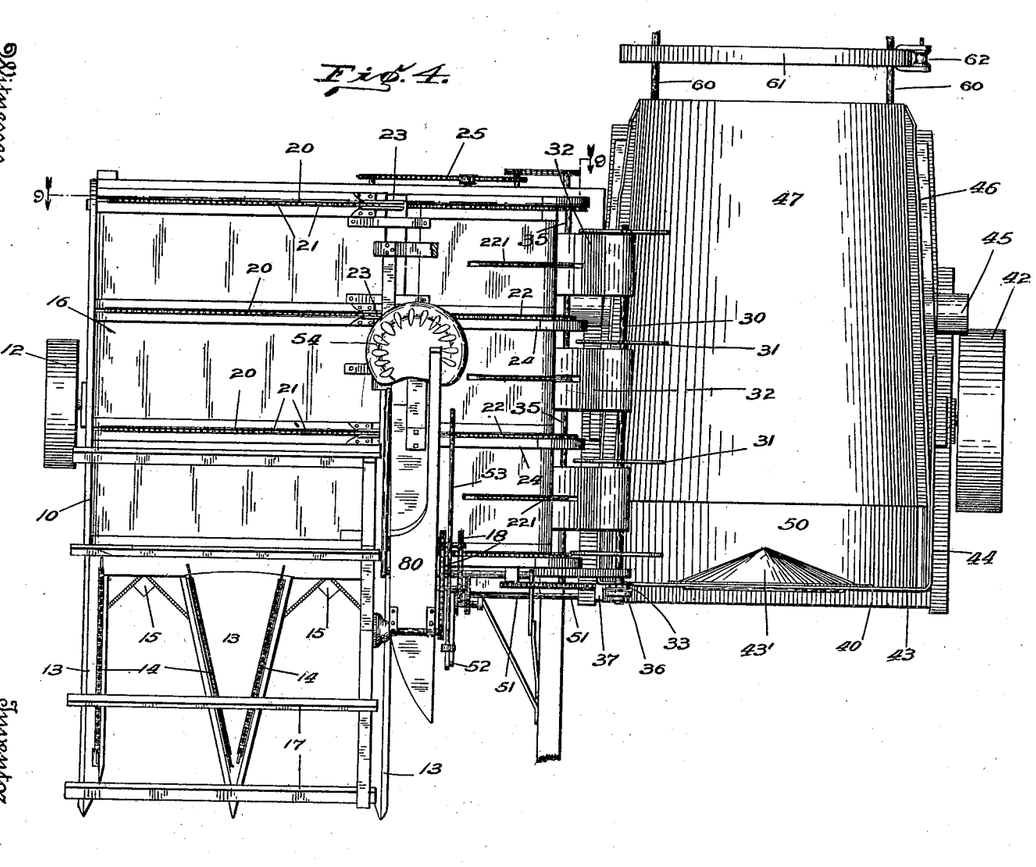
Fig. 4 a plan.
Figure 5:
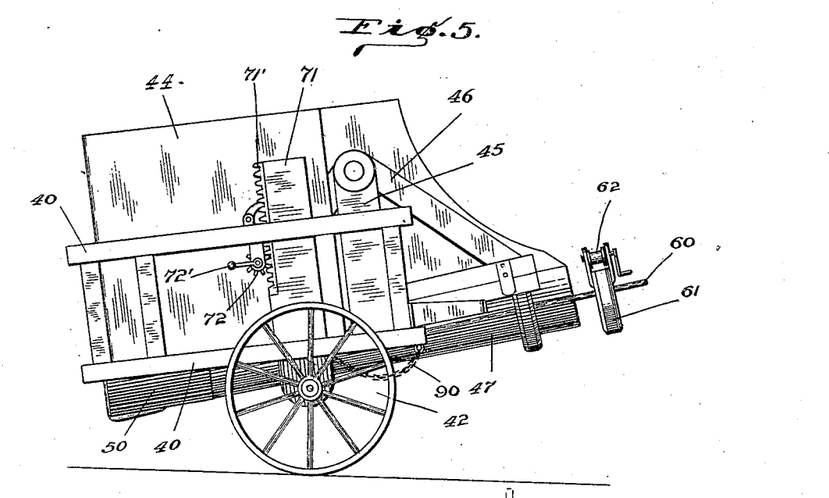
Fig. 5 a side elevation of the shock-forming mechanism.
Figure 6:
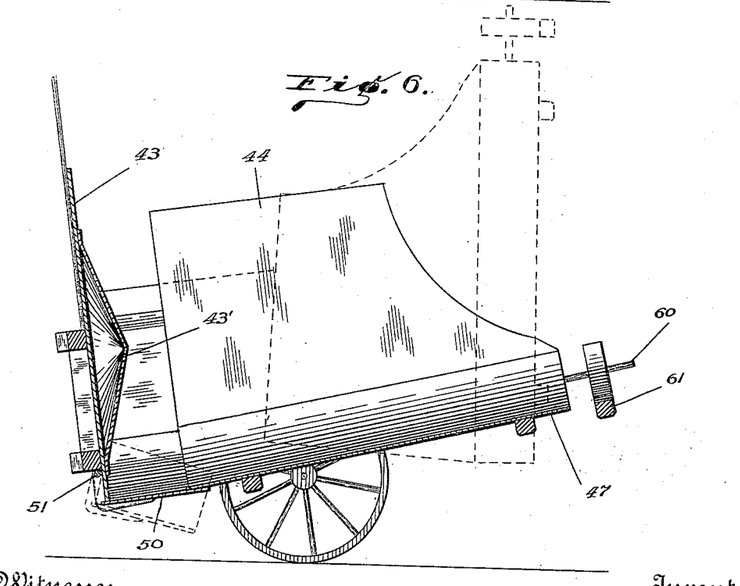
Fig. 6 a central vertical section thereof.
Figure 7:
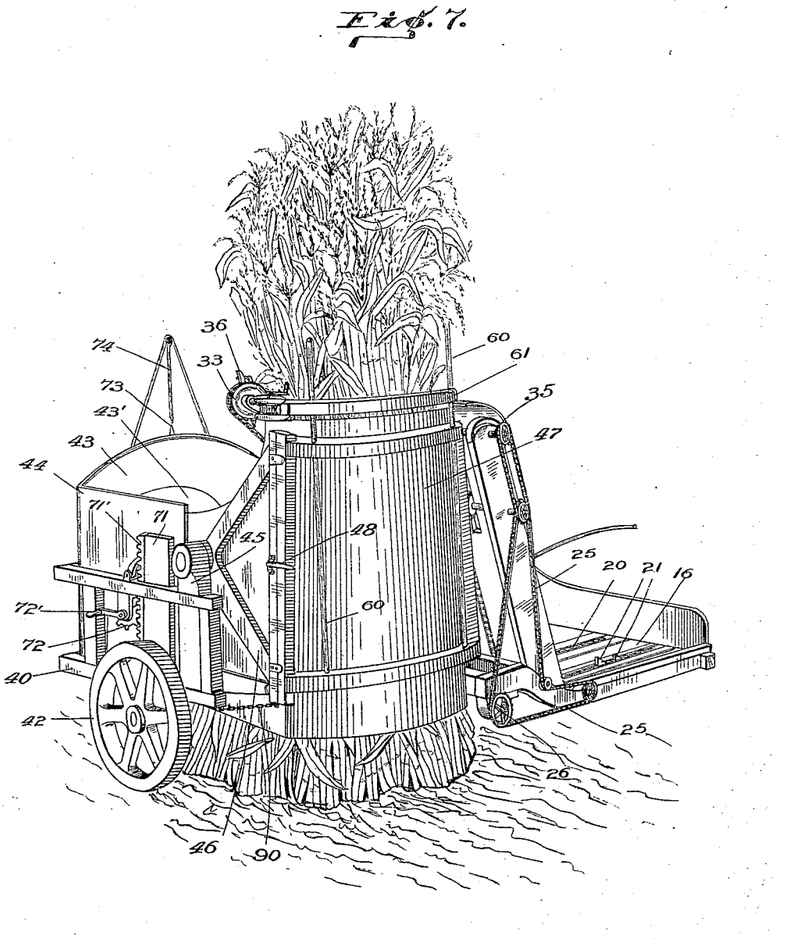
Fig. 7 a perspective view of a machine showing the manner of erecting a shock.

The shock-forming mechanism is preferably detachable from the cutter portion of the machine. The main frame 40 of the shock mechanism is connected to the frame 10 by a separable pivotal joint 41 and at the other side is supported by a carrying wheel 42 thus insuring a sufficient flexibility of framework between the two outside wheels 12 and 42 to permit the machine to be run along the ground. Frame 40 is substantially U-shaped in plan and is provided with a vertical butt-board 43 and adjacent flanking sides 44. Each side of frame 40 carries near its upper outer corner a bracket 45 to each of which is hinged a side 46 of a swinging shock holder, the two sides being connected by a door 47 which is hinged to one of the sides and detachably connected to the other by a suitable fastening 48. The sides 46 and door 47 form a U-shaped cradle into which the stalks are discharged by the arms 31, and the pivotal point of support of this cradle on the brackets 45 is preferably arranged to the rear of the longitudinal middle of the cradle in order that, when the cradle is released, it will tend normally to turn toward the position indicated in dotted lines in Fig. 6. In order to normally retain the cradle in receiving position I mount a gate 50 on shaft 51 arranged at the forward end of frame 40 and this gate is adapted to have its rear edge projected beneath the forward edge of the gate 47 when the parts are assembled in stalk-receiving position. Shaft 51 carries a lever 52 to the upper end of which is pivoted a hand link 53 which is extended back to within easy reach from the driver's seat 54. Attached to lever 52 is one end of a toggle 55, the other end being attached to the frame 10 and the arrangement being such that when the toggle is straightened to its rigid position lever 52 will be swung so as to hold gate 50 in the position shown in full lines in Fig. 6. Connecting hand link 53 with the toggle 55 near its joint is a link 57 by means of which the toggle joint may be broken by a slight upward swing of the hand link 53, the weight of said hand link normally tending to hold the toggle in its stiff position. Gate 47 is provided at its upper or rear end with a pair of projecting rods 60 upon which is slidably mounted a bar 61 carrying a winding drum 62 at one end.

It is necessary that the shock, when formed, be deposited upon the ground in a substantially upright position and in order to facilitate such deposition of the shock I deem it advisable to cone the butt of the shock as it is being formed. For this purpose a portion 43' of the butt-board 43 of the shock-forming cradle is coned so that the stalks, as they are deposited in the cradle with their butts against the butt-board 43, will be arranged so as to form an internal upwardly projecting conical hollow in the butt of the shock. If desired, the conical butt-board 43 may be utilized as a butter board by mounting the same upon a pivoted arm 70 which may be reciprocated by means of a cam 71 operated from shaft 26.

I also provide means for leveling the shock-forming frame and this may be conveniently done by mounting the carrying wheel 42 upon a vertically adjustable arm 71 which may be vertically adjusted relative to the frame 40 by any suitable means such as a pinion 72 engaging a rack 71' on arm 71, the pinion being rotatable by means of a crank 72'. In order to indicate the proper leveling of the shock-forming frame I provide, on butt-board 43, a fixed gage 73 and suspend above the same a swinging finger 74, the arrangement being such that when said two parts are in alinement the frame 40 will be substantially horizontal. In order to readily adjust the reel 17 to different heights of stalks I mount said reel upon the outer end of a lever 80, the rear end of which is extended back to convenient reach of the operator. Lever 80 is pivotally mounted upon the upper end of an arm 81, the lower end of which is pivotally mounted upon the frame 10, the arrangement being such that by swinging lever 81 backward or forward and by swinging the rear end of lever 80 up or down, the reel 17 may be raised or lowered.

Figure 8:
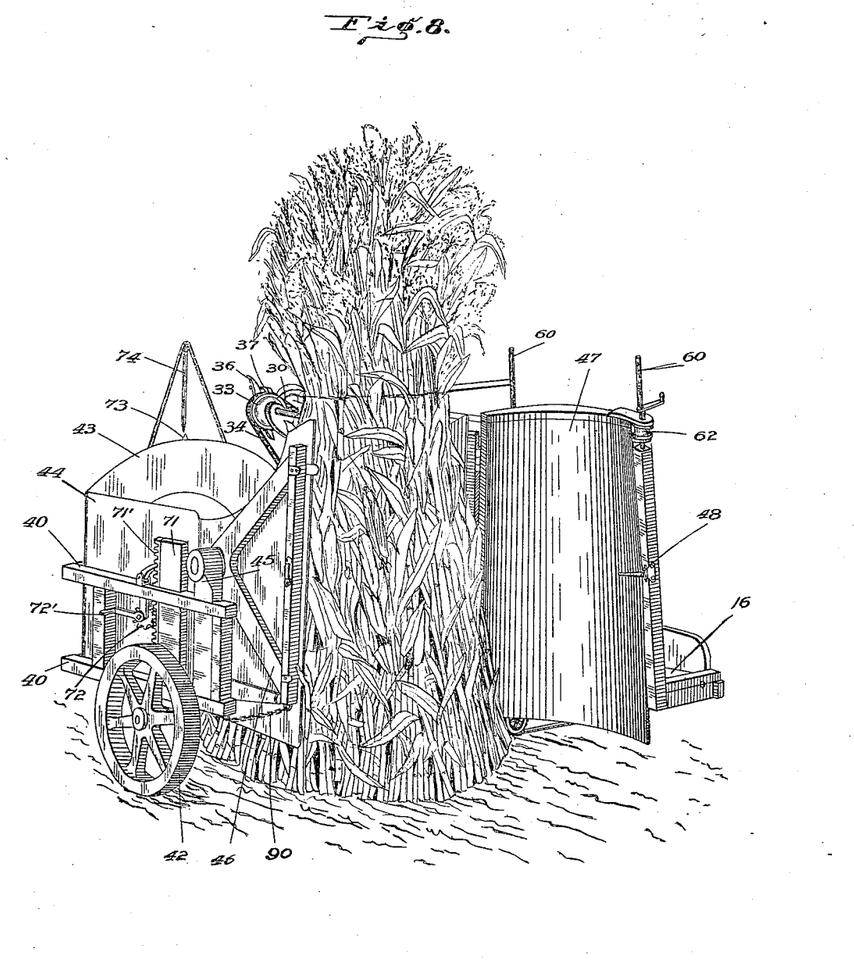
Fig. 8 a similar view showing the manner of discharging a formed shock, and Fig. 9 a vertical section on line 9—9 of Fig. 4.
Figures 9, 11:
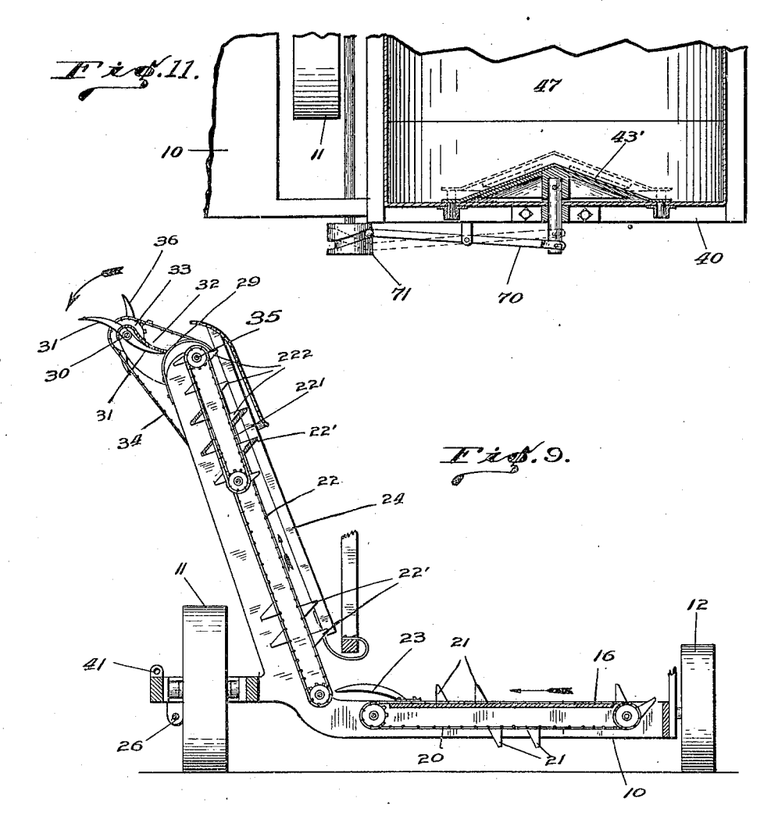
Figure 10:
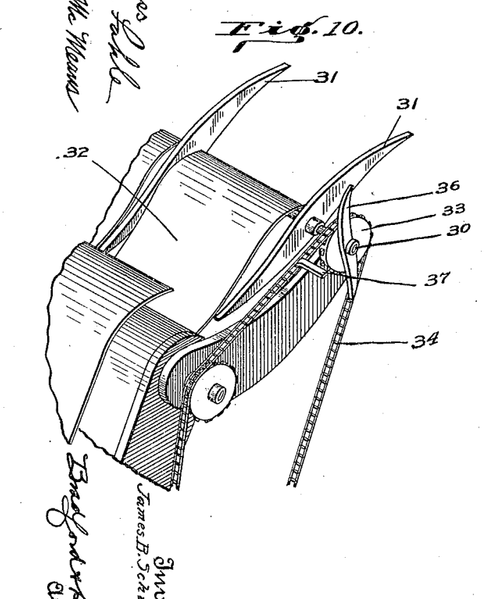
Fig. 10 a perspective detail, and Fig. 11 a detail of a modification.

In operation, the stalks will be cut by the cutter 15 and delivered to the table 16 upon which they will lie. The chains 20 will deliver these cut stalks to the elevator 22 which will discharge the same into the pocket 32 from whence the stalks are intermittently discharged by the arms 31 into the cradle 46—47. When the cradle has been sufficiently filled the machine will be stopped and an operator will pass a binding rope around the stalks at the proper point and attach the ends to the bar 61 and windlass 62, whereupon the binding rope may be tightly drawn about the waist of the shock and the binding twine applied. When the shock is to be deposited on uneven ground, it can be loosely tied in the cradle and then tightened after it has been set up. The hand link 53 will then be first lifted and drawn toward the operator, thus swinging the gate 50 downward to the position indicated in dotted lines in Fig. 6, thereby releasing the cradle 46—47 and permitting it to swing downward toward the position indicated by dotted lines in Fig. 6, the movement being completed by driving the team forward until the shock is substantially upright. Movement of the cradle to discharging position may be limited by any suitable means, for instance, a chain 90. As a preliminary to this operation the frame 40 will have been adjusted, by an adjustment of the carrying wheel 42, until it lies substantially horizontal. The shock, as it reaches the ground will engage the ground around the exterior or edge of the base of the shock, the internal coned bottom permitting an adjustment of the stalks to any inclination of the ground. As soon as the shock is deposited upon the ground latch 48 will be released and the door 47 of the cradle swung backward to the position shown in Fig. 8, whereupon the machine may be driven forward far enough to pull it away from the shock. Gate 47 will then be closed, the parts returned to their normal positions, and the operation repeated.

I claim as my invention:

1. In a stalk harvesting machine, the combination, with stalk cutting and delivering mechanism, of a pivoted substantially U-shaped stalk-receiving cradle comprising sides and a connecting portion detachably connected to one of said sides.

2. In a stalk harvesting machine, the combination, with the stalk-cutting and delivering mechanism, of a pivoted substantially U-shaped stalk-receiving cradle comprising sides and a connecting member hinged to one of said sides and detachably connected to the other of said sides.

3. In a stalk harvesting machine, the combination, with the stalk-cutting and delivering mechanism, of a pivoted substantially U-shaped stalk-receiving cradle comprising sides, and a conecting member hinged to one of said sides and detachably connected to the other of said sides, and compressing means carried by said member.

4. In a stalk harvesting machine, the combination, with the stalk-cutting and delivering mechanism, of a frame pivotally connected to the frame of the cutting and delivering mechanism on a substantially horizontal longitudinal axis a pivoted substantially U-shaped stalk receiving cradle supported by said frame and comprising sides and a connecting member hinged to one of said sides and detachably connected to the other of said sides.

5. In a stalk harvesting machine, the combination, with the stalk-cutting and delivering mechanism, of a frame pivotally connected to the frame of the cutting and delivering mechanism on a substantially horizontal longitudinal axis, a pivoted substantially U-shaped stalk receiving cradle supported by said frame and comprising sides and a connecting member hinged to one of said sides and detachably connected to the other of said sides, and compressing means carried by said member.

6. In a stalk harvesting machine, the combination with stalk-cutting and delivering mechanism, of a shock forming mechanism pivotally connected to the frame of the cutting and delivering mechanism on a substantially horizontal longitudinal axis and comprising a substantially vertical buttboard, a receiving member comprising a pair of sides and a connecting intermediate member movable relative to said sides, means for supporting said receiving member whereby it may be held in receiving position at an angle to the buttboard and may be moved to a substantially vertical position to erect the formed shock.

7. In a stalk harvesting machine, the combination, with stalk cutting and delivering mechanism, of a shock forming mechanism pivotally connected to the frame of the cutting and delivering mechanism on a substantially horizontal longitudinal axis and comprising a substantially vertical buttboard, a supporting frame therefor, a receiving member comprising a pair of sides pivoted on said support on a substantially horizontal axis, a gate hinged to one of said sides and detachably connected to the other side, means for holding said receiving member in substantially horizontal position adjacent the buttboard, and for holding said receiving member in a substantially vertical position to discharge the formed shock.

8. In a stalk harvesting machine, the combination with stalk cutting mechanism and shock-forming mechanism, of a stalk receiving mechanism arranged between the cutting mechanism and the shock forming mechanism, means for delivering the cut stalks from the cutting mechanism to said intermediate receiving mechanism, means for straightening the stalks in said receiving mechanism, and means for intermittently delivering the accumulated stalks in the intermediate receiving mechanism to the shock forming mechanism.

9. In a stalk harvesting machine, the combination with stalk cutting mechanism and shock forming mechanism, of a stalk receiving mechanism arranged between the cutting mechanism and the shock forming mechanism, means for delivering the cut stalks from the cutting mechanism to said intermediate receiving mechanism, and means traversing the intermediate stalk receiving mechanism for intermittently delivering the accumulated stalks in the intermediate receiving mechanism to the shock forming mechanism.

10. In a stalk harvesting machine, the combination with stalk cutting mechanism and shock forming mechanism, of a stalk receiving pocket arranged between the cutting mechanism and shock forming mechanism, means for delivering the cut stalks to said pocket, means for straightening the stalks as they are delivered to said pocket, and means for intermittently moving the accumulated stalks from said pocket to the shock forming mechanism.

11. In a stalk harvesting machine, the combination with stalk cutting mechanism and shock forming mechanism, of a stalk receiving pocket arranged between the cutting mechanism and shock forming mechanism, means for automatically delivering the cut stalks to said pocket, and means for intermittently moving the accumulated stalks from said pocket to the shock forming mechanism.

12. In a stalk harvesting machine, the combination with stalk cutting mechanism and shock forming mechanism, of a stalk receiving pocket arranged between the cutting mechanism and shock forming mechanism, means for delivering the cut stalks to said pocket, a rotary shaft arranged adjacent said pocket, arms carried by said shaft and adapted to traverse said pocket, and means for intermittently rotating said shaft whereby stalks accumulated in said pocket are intermittently delivered to the shock forming mechanism.

13. In a stalk harvesting machine, the combination with stalk cutting mechanism and shock forming mechanism, of a stalk receiving pocket arranged between the cutting mechanism and shock forming mechanism, means for delivering the cut stalks to said pocket, a rotary shaft arranged adjacent said pocket, arms carried by said shaft and adapted to traverse said pocket, and means for intermittently rotating said shaft whereby stalks accumulated in said pocket are intermittently delivered to the shock forming mechanism.

14. In a stalk harvesting machine, the combination with stalk cutting mechanism and a substantially horizontal shock forming cradle, of a stalk receiving mechanism arranged between the cutting mechanism and the shock forming mechanism, means for delivering the cut stalks from the cutting mechanism to said intermediate receiving mechanism, means for straightening the stalks in said receiving mechanism, and means for intermittently delivering the accumulated stalks in the intermediate receiving mechanism to the shock forming mechanism.

15. In a stalk harvesting machine, the combination with stalk cutting mechanism and a substantially horizontal shock-forming cradle, of a stalk receiving mechanism arranged between the cutting mechanism and the shock forming mechanism, means for delivering the cut stalks from the cutting mechanism to said intermediate receiving mechanism, and means traversing the intermediate receiving mechanism for intermittently delivering the accumulated stalks in the intermediate receiving mechanism to the shock forming mechanism.

16. In a stalk harvesting machine, the combination with stalk cutting mechanism and a substantially horizontal shock forming cradle, of a stalk receiving pocket arranged between the cutting mechanism and shock forming mechanism, means for delivering the cut stalks to said pocket, means for straightening the stalks as they are delivered to said pocket, and means for intermittently moving the accumulated stalks from said pocket to the shock forming mechanism.

17. In a stalk harvesting machine, the combination with stalk cutting mechanism and a substantially horizontal shock forming cradle, of a stalk receiving pocket arranged between the cutting mechanism and shock forming mechanism, means for delivering the cut stalks to said pocket, and means for intermittently moving the accumulated stalks from said pocket to the shock forming mechanism.

18. In a stalk harvesting machine, the combination with stalk cutting mechanism and a substantially horizontal shock forming cradle receiving pocket arranged between the cutting mechanism and shock forming mechanism, means for delivering the cut stalks to said pocket, a rotary shaft arranged adjacent said pocket, arms carried by said shaft and adapted to traverse said pocket, and means for intermittently rotating said shaft whereby stalks accumulated in said pocket are intermittently delivered to the shock forming mechanism.

19. In a stalk harvesting machine, the combination with stalk cutting mechanism and a substantially horizontal shock-forming cradle, of a stalk receiving pocket arranged between the cutting mechanism and shock-forming mechanism, means for delivering the cut stalks to said pocket, a rotary shaft arranged adjacent said pocket, arms carried by said shaft and adapted to traverse said pocket, an arm carried by the shaft, an endless belt, and a finger carried by said belt and adapted to intermittently engage said arm to rotate the shaft.

20. In a stalk harvesting machine, the combination with stalk cutting mechanism and a substantially horizontal shock-forming cradle, of a stalk receiving mechanism arranged between the cutting mechanism and the shock-forming mechanism, means for delivering the cut stalks from the cutting mechanism to said intermediate receiving mechanism, means for straightening the stalks in said receiving mechanism, means for intermittently delivering the accumulated stalks in the intermediate receiving mechanism to the shock forming mechanism, means for erecting the shock-forming cradle, and means for releasing the erected shock therefrom, 21. In a stalk harvesting machine, the combination with stalk cutting mechanism and a substantially horizontal shock-forming cradle, of a stalk receiving pocket arranged between the cutting mechanism and shock-forming cradle, means for delivering the cut stalks to said pocket, means for straightening the stalks as they are delivered to said pocket, means for intermittently moving the accumulated stalks from said pocket to the shock-forming cradle, means for erecting the shock-forming cradle, and means for releasing the erected shock therefrom.

22. In a stalk harvesting machine, the combination with stalk cutting mechanism and a substantially horizontal shock forming cradle, of a stalk receiving pocket arranged between the cutting mechanism and shock forming cradle, means for delivering the cut stalks to said pocket, a rotary shaft arranged adjacent to said pocket, arms carried by said shaft and adapted to traverse said pocket, means for intermittently rotating said shaft whereby stalks accumulated in said pocket are intermittently delivered to the shock-forming mechanism, means for erecting the shock-forming cradle, and means for releasing the erected shock therefrom.

In witness whereof, I, have hereunto set my hand and seal at Indianapolis, Indiana, this 9" day of May, A. D. one thousand nine hundred and six.

JAMES B. SCHUMAN. [L. S.]

Witnesses:
 THOMAS W. McMEANS,
 ARTHUR M. HOOD.